United States Patent [19]

Chambers et al.

[11] 4,326,325
[45] Apr. 27, 1982

[54] METHOD AND APPARATUS FOR DEFLASHING MOLDED RECORDED DISCS

[75] Inventors: Robert W. Chambers, Willingboro; Frank Cuomo, Jr., Princeton, both of N.J.

[73] Assignee: RCA Corporation, New York, N.Y.

[21] Appl. No.: 170,814

[22] Filed: Jul. 21, 1980

[51] Int. Cl.³ .................. B23B 7/00; B23B 1/00; B23C 1/00
[52] U.S. Cl. .................................. 29/27 C; 82/47; 82/101; 409/132
[58] Field of Search ............... 29/27 C; 82/46, 47, 82/52, 54, 55, 71, 75, 83, 86, 95, 98, 100, 101; 409/131, 132, 137, 138, 165, 166, 184, 199, 203

[56] References Cited

U.S. PATENT DOCUMENTS

| 835,341 | 11/1906 | Winfree, Jr. | 409/165 |
|---|---|---|---|
| 1,685,572 | 9/1928 | Onsrud | 409/165 |
| 1,921,715 | 8/1933 | Whitney et al. | 409/165 |
| 3,129,447 | 4/1964 | Ralphs | 409/138 |
| 3,134,998 | 6/1964 | Kunze et al. | 409/138 |
| 3,477,121 | 11/1969 | Martin | 29/27 C |
| 3,971,294 | 7/1976 | Devrick et al. | 409/137 |
| 4,140,035 | 2/1979 | Pullen | 82/47 |

*Primary Examiner*—Harrison L. Hinson
*Attorney, Agent, or Firm*—Birgit E. Morris; Donald S. Cohen

[57] ABSTRACT

The flash is removed from a freshly molded recorded disc by first bringing a knife against the edge of the disc and rotating the disc about its center to remove the major portion of the flash. A rotary cutter is then brought into contact with the edge of the rotating disc to remove the remaining portion of the flash. The rotary cutter provides the disc with a smooth edge and allows an accurate control of the diameter of the disc. The cutter is mounted on a pivotal bracket which is selectively moved toward and away from the disc by means of an air cylinder and piston which is connected to the bracket.

10 Claims, 4 Drawing Figures

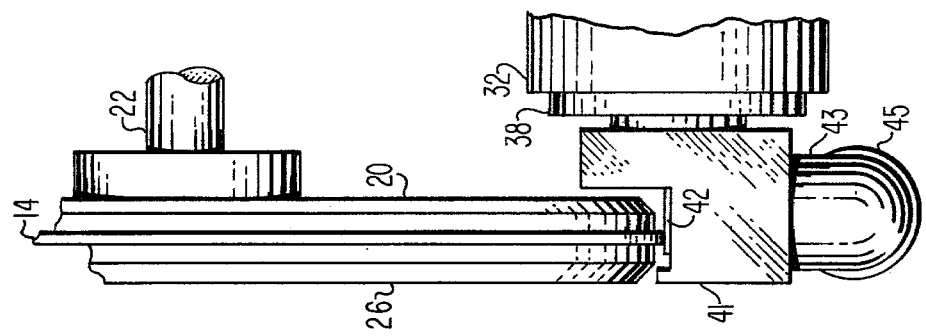
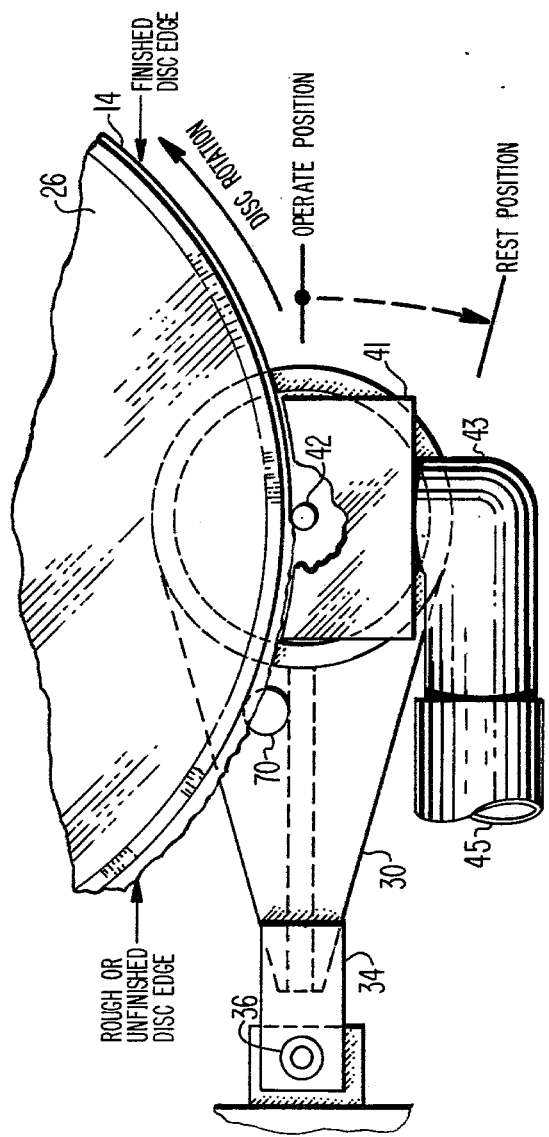

METHOD AND APPARATUS FOR DEFLASHING MOLDED RECORDED DISCS

BACKGROUND OF THE INVENTION

The present invention relates to a method and apparatus for deflashing molded recorded discs, and particularly to a method and apparatus for cutting the edge of the molded disc to a controlled size after removing the major portion of the flash by a knife.

Recorded discs are flat, circular plates of a plastic material having information on one or both surfaces thereof in the form of a surface relief pattern formed along a spiral path. Generally, the surface relief pattern is formed in a spiral groove in the surface of the disc. The discs are generally formed in a mold press having a pair of mold plates, at least one of which is movable toward and away from the other and which, when together, form a mold cavity therebetween of the size and shape of the disc. On the opposed surfaces of the plates are stampers which have on their surfaces the negative of the surface relief pattern to be formed in the surfaces of the disc. When a disc is molded in such a mold press, excess plastic material flows radially outwardly beyond the edge of the mold cavity so that the molded disc has excess material around its edge, known as "flash", which must be removed. This removal of the flash is generally achieved by placing the still warm disc directly from the mold press onto a circular support plate with the flash projecting beyond the edge of the plate and rotating the plate. A knife is pressed against the rotating disc so that the knife cuts off the flash up to the edge of the disc. Such an apparatus is shown in U.S. Pat. No. 3,412,427 to J. Flushfeder et al, issued Nov. 26, 1968, entitled "Apparatus For Manufacturing Disc Records".

Recently there has been developed a high density recorded disc, such as a video disc, which contains a large number of revolutions of the recorded path, about 10,000 per inch along the radius of the disc. One type of such recorded disc is made of a plastic material which is filled with conductive carbon so that the disc is conductive. This type of disc is more brittle than discs which do not contain the conductive carbon. It has been found that when the flash is removed from this type of disc by means of a knife, the edge of the disc is not smooth. Also, since the disc is more difficult to cut with a knife, it is difficult to accurately control the diameter of the disc after flash removal. It has been found desirable to place this type of disc in a carrier or caddy to protect the surface of the disc from dirt and other contaminants. In order to permit the disc to be removed from and replaced into the caddy, it is desirable to accurately control the diameter dimension of the disc. Therefore, it is desirable to have means for removing the flash from the disc which provides the disc with a smooth edge and which will permit accurate control of the diameter of the disc.

SUMMARY OF THE INVENTION

A method and apparatus for removing flash from the edge of a flat, circular, recorded disc includes means for supporting the disc for rotation about the center of the disc and a rotary cutter mounted adjacent the supporting means. After the major portion of the flash is removed from the disc with a knife, the rotary cutter is moved against the disc to cut the edge of the disc and provide it with a smooth edge and a controlled diameter.

BRIEF DESCRIPTION OF THE DRAWINGS

FIG. 3 is a top plan view of the deflashing apparatus.

FIG. 4 is an end plan view of the deflashing apparatus.

DETAILED DESCRIPTION

Figure 1:
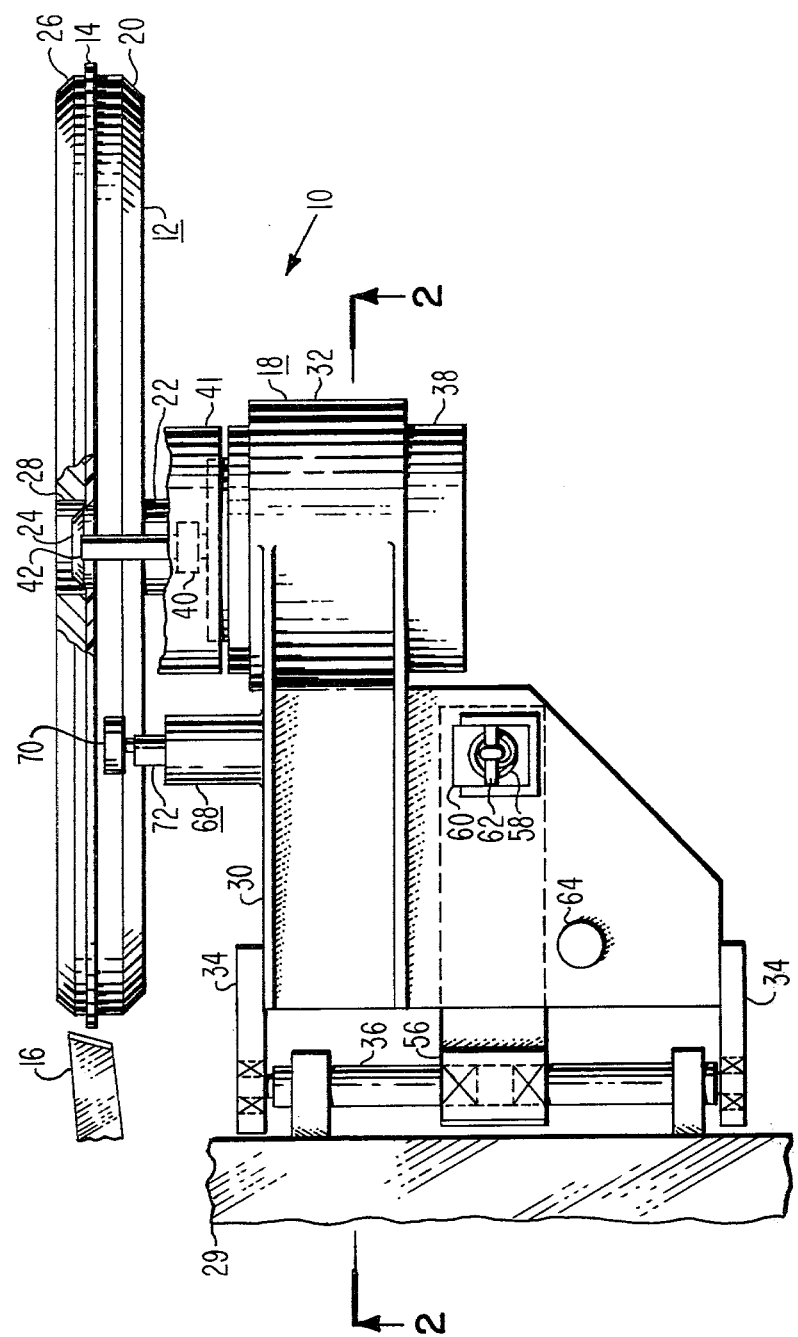
FIG. 1 is a side elevational view of a deflashing apparatus incorporating the present invention.

Referring to FIG. 1, the flash trimming apparatus which incorporates the present invention is generally designated as 10. The flash trimming apparatus 10 includes a support, generally designated as 12, for the molded disc 14 to be trimmed, a knife 16 for removing the major portion of the flash, and the cutting apparatus 18 of the present invention for removing the additional flash to provide the disc 14 with a smooth edge and a desired controlled diameter.

The support 12 includes a circular plate 20 having a flat top surface and mounted at its center on a rotary shaft 22. The support plate 20 has a circular hub 24 projecting from the center of its top surface which is adapted to extend through the center hole in the recorded disc 14. A circular top plate 26 is seated on the recorded disc 14 and has a center hole 28 therethrough which receives the hub 24. The top plate 26 is supported by a mechanism, not shown, which will move the top plate 26 toward and away from the support plate 20 to permit an untrimmed disc 14 to be placed therebetween and then removed after it is trimmed. The knife 16 is mounted adjacent the edge of the plates 20 and 26 and is supported by a mechanism, not shown, which will move the knife toward and away from the edge of the disc 14 to permit the removal of a major portion of the flash from the disc. A support and knife mechanism which may be used is disclosed in more detail in previously referred to U.S. Pat. No. 3,412,427.

The cutting apparatus 18 which incorporates the present invention is mounted on a support 29 adjacent the disc support 12. The cutting apparatus 18 includes a mounting bracket 30 having along one edge a cylindrical motor support 32. Projecting from another edge of the bracket 30 are a pair of spaced, parallel pivot arms 34 which are pivotally mounted on the ends of a pivot pin 36 which is secured to the support 29. The pivot arms 34 extend perpendicular to the axis of the cylindrical motor support 32 and the pivot pin 36 extends parallel to the axis of the shaft 22 so that the mounting bracket 30 will pivot toward and away from the plates 20 and 26. An electric motor 38 is secured in the motor support 32 and has a collet 40 on the end of its shaft. A rotary cutter 42, such as a router bit, is secured in the collet 40 and extends transversely across the edge of the recorded disc 14.

A chip collector housing 41 partly surrounds the cutter 42 and is mounted on the motor 38. As shown in FIG. 4, the collector housing 41 has an opening therein which exposes the cutter 42 to the edge of the disc 14. As shown in FIG. 3, an exhaust tube 43 extends from the back of the collector housing 41 and is connected by a hose 45 to a source of vaccum, not shown.

Figure 2:
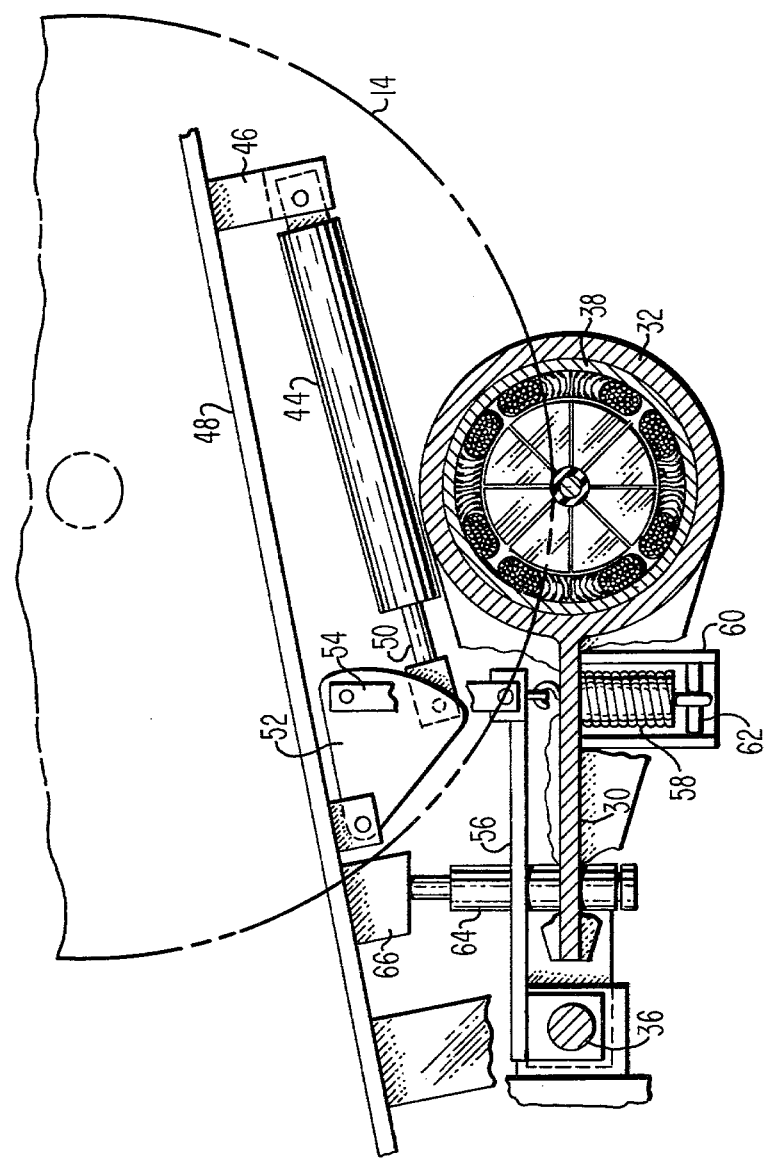
FIG. 2 is a sectional view taken along line 2—2 of FIG. 1.

The mounting bracket 30 and motor 38 is moved toward and away from the support plate 20 by means of an air cylinder 44 shown in FIG. 2. The air cylinder 44 is mounted beneath the support plate 20 with its end being pivotally mounted on a bracket 46 extending from a fixed support 48. A piston rod 50 extends from the air cylinder 44 and is pivotally connected to a corner of a pie shaped bell crank 52. The apex of the bell crank 52 is pivotally mounted on the fixed support 48. A link 54 is pivotally connected to another corner of the bell crank 52 and extends toward the mounting bracket 30. The other end of the link 54 is pivotally connected to a lever 56 which extends parallel to the mounting bracket 30 and is pivotally supported at one end on the pivot pin 36. The lever 56 is connected to the mounting bracket 30 through a helical spring 58. The helical spring 58 extends through a tube 60 secured to the mounting bracket 30 and the end of the spring 58 is secured to a pin 62 extending transversely across the tube 60.

An adjustable dash pot damper 64 is secured to the mounting bracket 30 and projects toward a stop 66 on the fixed support 48. A stop member 68 is mounted on the top of the mounting bracket 30 and includes a small rotatable wheel 70 which is adapted to engage the edge of the circular support plate 20. The wheel 70 is mounted on an eccentric shaft 72, the axis of which is offset from the axis of the wheel 70 and which can be rotated to change the position of the wheel 70 toward or away from the support plate 20.

In the operation of the flash trimming apparatus 10, with the top plate 26 removed from the disc support plate 20, a freshly molded disc 14 having the flash thereon is placed on the support plate 20 and the top plate 26 is then placed on the disc 14 to secure it in position. The plates 20 and 26 are rotated so as to rotate the disc 14, and the trimming knife 16 is moved into engagement with the disc 14 to remove the major portion of the flash. After the major portion of the flash is removed, the air cylinder 44 is actuated to pull the piston rod 50 into the air cylinder 44. This rotates the bell crank 52 so as to pivot the mounting bracket 30 toward the disc 14 through the link 54, lever 56 and spring 58. This pivotation of the mounting bracket 30 carries the cutter 42, which is being rotated by the motor 38, toward the edge of the disc 14. Just prior to the cutter 42 contacting the edge of the disc 14, the dash pot damper 64 engages the stop 66 so that continued movement of the pivotation of the mounting bracket 30 is slowed down so that the cutter 42 is moved gradually into contact with the edge of the rotating disc 14. The cutter 42 is moved radially inwardly against the edge of the disc 14 until the wheel 70 engages the peripheral edge of the support plate 20. This controls the depth of the cut so as to accurately control the final diameter of the disc 14. The depth of the cut can be adjusted by means of the eccentric 72.

With the rotating cutter 42 engaging the edge of the disc 14, one revolution of rotation of the disc 14 will remove the remaining portion of the flash to provide the disc 14 with an accurately controlled diameter. Also, it has been found that the rotary cutter 42 provides the disc 14 with a smooth edge. The chips removed by the cutter 42 are collected in the housing 41 and removed through the exhaust tube 43 by the vacuum system. The air cylinder 44 is then actuated to move the piston rod 50 outwardly. This rotates the bell crank 52 in a direction to push the mounting bracket 30 away from the disc 14 so that the cutter 42 is moved away from the edge of the disc 14. The top plate 26 may then be removed to permit removal of the deflashed disc 14.

We claim:

1. Apparatus for removing flash from the edge of a flat, circular, recorded disc comprising
   means for supporting the disc for rotation about the center of the disc;
   a rotary cutter mounted adjacent said supporting means, and extending transversely across the peripheral edge of said supporting means;
   means for selectively moving said cutter toward said supporting means so as to bring the cutter into engagement with the edge of a disc supported thereon and away from said supporting means; and
   means mounted adjacent the disc support and adapted to remove a major portion of the flash from the disc prior to the cutter being moved against the disc.

2. Apparatus in accordance with claim 1 including a mounting bracket pivotally mounted adjacent said disc supporting means for pivotal movement toward and away from said supporting means, a motor mounted on said mounting bracket and having a shaft to which the rotary cutter is secured.

3. Apparatus in accordance with claim 2 in which the means for selectively moving the cutter toward and away from the disc support includes an air cylinder pivotally mounted on a fixed support, a piston rod extending from said cylinder, and linkage means connecting the piston rod to the mounting bracket so that movement of said piston rod into and out of the cylinder pivots said mounting bracket toward and away from the disc support.

4. Apparatus in accordance with claim 3 including stop means on said mounting bracket and engagable with the disc support means to limit the movement of the cutter against the disc.

5. Apparatus in accordance with claim 4 in which said stop means is adjustable to permit varying the distance that the cutter moves toward the disc.

6. Apparatus in accordance with claim 3 including a dash pot damper mounted on the mounting bracket and a stop mounted on a fixed support and engagable by the damper to slow down the movement of the bracket when the cutter comes into close proximity to the disc.

7. Apparatus in accordance with claim 3 including a chip collector housing partially surrounding the cutter and adapted to catch chips cut from the disc and an outlet pipe extending from the housing and adapted to be connected to a vacuum source.

8. Apparatus in accordance with claim 1 including a knife mounted adjacent the disc support and adapted to remove the major portion of the flash from the disc prior to the cutter being moved against the disc.

9. A method of deflashing a molded recorded disc which comprises the steps of
   removing a major portion of the flash from the edge of the disc; then
   bringing a rotating cutter into contact with the edge of the disc; and
   rotating the disc about its center so that the cutter removes a portion of the disc completely around the disc.

10. A method in accordance with claim 9 in which the major portion of the flash is removed by bringing a knife into contact with the edge of the disc and rotating the disc about its center.

* * * * *